Patented Mar. 20, 1945

2,371,719

UNITED STATES PATENT OFFICE 2,371,719

PROCESS FOR POLYMERIZING CHLOROPRENE IN THE PRESENCE OF SULPHUR DIOXIDE AND PRODUCT THEREOF

Howard Warner Starkweather, Westover Hills, Del., assignor to E. I. du Pont de Nemours & Company, Wilmington, Del., a corporation of Delaware No Drawing. Application March 1, 1940, Serial No. 321,667

17 Claims. (Cl. 260—79)

This invention relates to the polymerization of halogen-2-butadienes-1,3. More particularly, it relates to the polymerization of chloro-2-butadiene-1,3 (hereinafter, for convenience, also called "chloroprene"). Still more particularly, it relates to an improved method for polymerizing chloro-2-butadiene-1,3 in the presence of sulphur dioxide, thereby producing plastic polymers of chloroprene which, when cured, have improved solvent resistance.

Carothers and Collins, in their U. S. Patent No. 1,950,432, disclose that, by polymerizing chloro-2-butadiene-1,3 under various conditions, it is possible to obtain products having a variety of degrees of solubility, plasticity, elasticity, and strength. They state that light and pressure and catalysts, such as oxygen and peroxides, influence the polymerization.

Carothers, Collins and Kirby disclose, in their U. S. Patent No. 1,950,438, that the character of the product may be modified by carrying out the polymerization in the presence of "inhibitors." Among the "inhibitors" they investigated were various organic sulphur compounds.

U. S. Patent No. 1,967,860, also issued to Carothers, Collins and Kirby, discloses that this polymerization may be carried out in the presence of various solvents.

The emulsification of chloro-2-butadiene-1,3 and its polymerization in that state to obtain a synthetic latex is disclosed in Collins' U. S. Patent No. 1,967,861. Ordinarily, the product obtained by coagulating this emulsion after polymerization to a synthetic latex, is an elastic, nonplastic, cured rubber, but, if the chloro-2-butadiene-1,3 contains 1 per cent of iodine, it polymerizes to a plastic product. Collins also discloses that the addition of diluents or solvents, before or after emulsification, tends to impart a greater degree of softness and plasticity to the final product. Dales and Downing, in U. S. Patent No. 2,138,226, have described an improved method of emulsion polymerization involving the use of different emulsifying agents.

Williams, in his U. S. Patent No. 1,950,436, discloses that plastic polymers may be produced by partially polymerizing chloro - 2 - butadiene - 1,3 and then separating the unpolymerized material. He describes a method which involves partially polymerizing chloro-2-butadiene-1,3 without the use of solvents, dispersing media, and the like. This method is hereinafter referred to as "massive" polymerization. By suitable compounding and curing, these plastic polymers can be converted into an extremely tough elastic product resembling vulcanized rubber.

Cured natural rubber is considerably swollen and deteriorated when it comes in contact with many organic solvents. Chloroprene and similar halogen substituted dienes may be polymerized according to a number of processes, already published or in copending patent applications, to yield plastic, rubber-like polymers which have certain important advantages over natural rubber, one of which is greater resistance in the cured state to organic solvents, particularly hydrocarbons. For certain purposes, however, products of even greater resistance are desired.

This application is a continuation-in-part of applicant's copending application, Serial No. 69,739, filed March 19, 1936.

It is an object of this invention to provide an improved method for preparing derivatives of compounds of the general formula

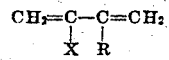

in which X is halogen and R is hydrogen or a hydrocarbon radical. A further object is to provide an improved method for polymerizing halogen-2-butadienes-1,3. A more specific object is to provide a method by which high yields of plastic polymer may be produced from chloro-2-butadiene-1,3 in a single polymerization. A still further object is to produce, in a single polymerization, high yields of a plastic polymer of chloro-2-butadiene-1,3 of good stability resembling unvulcanized Hevea rubber in its physical properties and capable of being shaped and cured to form a tough elastic mass resembling vulcanized natural rubber. Another object is to produce a plastic polymer which can be readily converted into an odorless elastic substance. Another object is to produce polymeric materials which may be processed like natural rubber and which will have, in the cured state, a very high degree of resistance to the action of hydrocarbon solvents. Other objects will appear hereinafter.

The objects are accomplished by polymerizing compounds of the general formula

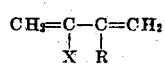

in which X is halogen and R is hydrogen or a hydrocarbon radical, and especially chloro-2-butadiene-1,3, in the presence of sulphur dioxide. Under preferred conditions, the chloro-2-butadiene-1,3 is polymerized in an emulsified form in the presence of sulphur dioxide. The preferred dispersing medium is water. The invention is described in detail, hereinafter, with reference to the use of sulphur dioxide, but it will be obvious that its equivalents may be similarly employed.

The essential feature of the invention is that sulphur dioxide be present as such during the polymerization. Although, as indicated above, the best results are obtained when polymerization is carried out in aqueous emulsion, it is by no means necessary that the chloroprene be in an emulsified state. On the contrary, it has been found that sulphur dioxide is capable of promoting an improved yield of plastic polymer from these dienes under many different conditions. It is effective in massive polymerization or solution polymerization as well as in emulsion polymerization which includes not only aqueous emulsions but also non-aqueous emulsions. By "solution polymerization" is meant polymerization of the halogen diene while it is in solution either in a solvent or diluent such as benzene or carbon tetrachloride or in a polymerizable solvent such as methyl methacrylate. The unemulsified polymerization may be carried out, for example, according to the procedure of U. S. Patent No. 1,950,436.

Polymerization of compounds of the class described in the presence of sulphur dioxide unexpectedly results in yields of plastic polymer in excess of 50 per cent.

In addition to producing a high yield of plastic polymer, the addition of sulphur dioxide gives a polymer which, when cured, has an increased resistance to the action of solvents. The already good solvent resistance of chloroprene polymers is materially increased. This increase in solvent resistance is proportional to the amount of sulphur dioxide in chemical combination with the chloroprene over ranges more fully set forth below.

The class of halogen dienes to which this invention has been found to be applicable are those which have the above general formula. The definitely preferred member of this group is chloro-2-butadiene-1,3, which, as has been previously disclosed, possesses the ability to polymerize to a rubber-like material which is similar to natural rubber. Although the other halogen dienes included in the class, which have thus far been tested, do not all possess this property to the same degree as chloroprene, they do, nevertheless, polymerize to more or less rubber-like materials and it has been found that, if their polymerization is carried out in the presence of sulphur dioxide, an improved yield of a more plastic polymer is obtained as contrasted with the product obtained from the same halogen diene in the absence of sulphur dioxide. Thus, an increased yield of more plastic polymer can be obtained from bromo-2-butadiene-1,3 and also from chloro-2-methyl-3-butadiene-1,3 when they are polymerized in the presence of sulphur dioxide. Mixtures of two or more halogen butadienes may also be polymerized by the method of this invention. Similar increase in solvent resistance is obtained.

The sulphur dioxide may be brought into contact with the halogen diene, whether in solution, emulsion, or the massive state, in any convenient manner, such as by the direct addition of gaseous or liquid sulphur dioxide or by the addition of a solution of sulphur dioxide in water or in an emulsifying solution or by dissolving the sulphur dioxide in the halogen diene. Also, if desired, instead of adding sulphur dioxide as such, a salt, such as sodium bisulphite, may be added, which, upon the addition of acid, will generate sulphur dioxide.

A number of embodiments of the present process are described in the examples appearing hereinafter. These examples are directed to polymerization in aqueous emulsion, the preferred type, but it will be understood that similar considerations will apply, in general, to polymerization in the massive state, in solution, etc. Thus, the amount of sulphur dioxide present may vary with reference to the amount of halogen diene. Likewise, various temperatures and pressures may be used as well as various concentrations of halogen diene in the mass in which the polymerization is taking place.

Attention is called to the fact that, in these examples, as well as throughout the specification and claims, wherever the terms "parts" is used, it is intended to mean "parts by weight." The examples, of course, are merely illustrative, and it is not applicant's intention to be limited to the specific conditions of operation or other details therein set forth.

*Example I*

Two hundred fifty parts of chloro-2-butadiene-1,3 were thoroughly emulsified in 850 parts of 2 per cent cetyl trimethyl ammonium bromide aqueous solution. One hundred fifty parts of 2 per cent cetyl trimethyl ammonium bromide aqueous solution containing 10 parts of sulphur dioxide were immediately added to the emulsion. This emulsion was maintained at 20° C. for 4 hours. Two and five tenths (2.5) parts of phenyl beta naphthylamine dissolved in 25 parts benzene and emulsified with 25 parts of 2 per cent cetyl trimethyl ammonium bromide aqueous solution were then added. The polymer was next coagulated by adding the emulsion to an equal volume of ethyl alcohol and separated from the serum. Volatile material was removed by working the coagulated polymer to constant weight on a rubber mill.

A 73.5 per cent yield of polymer with a plasticity number of 94 and good aging properties was obtained by this method. (Plasticity number, as used herein, is the thickness in thousandths of an inch of a sample 2.5 cc. in volume in the form of a cylinder ⅝" in diameter which has been heated to 80° C. for 15 minutes and then kept under a weight of 5 kilograms for 3 minutes at 80° C.) One hundred parts of this polymer was compounded with 5 parts of zinc oxide, 10 parts of magnesium oxide, and 5 parts of rosin and heated for 30 minutes at 142° C. The resulting product had a tensile strength of 3250 pounds per square inch.

(Note: The addition of phenyl-beta-naphthylamine, coagulation with ethyl alcohol, separation from the serum, and removal of volatile matter on a rubber mill are common to all of these examples and should be understood unless otherwise stated.)

*Example II*

Another emulsion of chloro-2-butadiene-1,3 prepared by the same method as Example I was allowed to polymerize for 18 hours at about room temperature. This gave an 85.6 per cent yield of a polymer with a plasticity number of 71–75 which cured to give a product with a tensile strength of 3125 pounds per square inch.

This cured material immersed in kerosene for 7 days at 100° C. showed an increase of 62 per cent by volume.

*Example III*

Two hundred fifty parts of chloro-2-butadiene-1,3 were emulsified in a solution containing 300 parts of 2 per cent cetyl trimethyl ammonium bromide aqueous solution and 500 parts of water. Two hundred parts of 2 per cent cetyl trimethyl ammonium bromide aqueous solution containing 10 parts of sulphur dioxide were added and the emulsion allowed to polymerize for 16 hours at about room temperature. A 90.3 per cent yield of a product with a plasticity number of 99 which after curing had a tensile strength of 3075 pounds per square inch was obtained.

*Example IV*

Two hundred fifty parts of chloro-2-butadiene-1,3 were emulsified in a solution containing 125 parts of 2 per cent cetyl trimethyl ammonium bromide aqueous solution and 625 parts of water. After emulsification, 250 parts of 1 per cent cetyl trimethyl ammonium bromide aqueous solution containing 10 parts of sulphur dioxide were added. The sample was allowed to polymerize over night at about room temperature and gave a 67 per cent yield of a polymer with a plasticity number of 97 which cured to give a product with a tensile strength of 2700 pounds per square inch.

Although, in each of the above examples, 4 per cent of sulphur dioxide, based on the weight of the chloro-2-butadiene-1,3 is employed, it has been found that the amount of sulphur dioxide can be varied as illustrated in the following examples.

*Example V*

Two hundred fifty parts of chloro-2-butadiene-1,3 were emulsified in 916 parts of 2 per cent cetyl trimethyl ammonium bromide aqueous solution and 84 parts more of the solution containing 4 parts of sulphur dioxide added. The emulsion was cooled to 20° C. and allowed to polymerize over night at about room temperature. This gave a 90 per cent yield of a product with a plasticity number of 130 which, after compounding and curing, had a tensile strength of 2875 pounds per square inch.

*Example VI*

Two hundred fifty parts of chloro-2-butadiene-1,3 were emulsified in 708 parts of 2 per cent cetyl trimethyl ammonium bromide aqueous solution and 292 parts more of the cetyl trimethyl ammonium bromide solution containing 14 parts of sulphur dioxide added. After polymerization over night at about room temperature, this gave an 89 per cent yield of product with plasticity number of 128, which, after compounding and curing, had a tensile strength of 2100 pounds per square inch.

A high yield of plastic polymer is also obtained when the chloro-2-butadiene-1,3 is partially polymerized before it is emulsified and treated with sulphur dioxide.

*Example VII*

One hundred ninety parts of chloro-2-butadiene-1,3 was allowed to stand at room temperature until it was 8.2 per cent polymerized. It was then emulsified in 710 parts of aqueous 2 per cent cetyl trimethyl ammonium bromide solution and treated with 88 parts of aqueous 2 per cent cetyl trimethyl ammonium bromide solution containing 8 parts of sulphur dioxide. The resulting emulsion was polymerized for 4½ hours at 20° C. and then coagulated and worked up in the usual manner. An 89 per cent yield was obtained of a product with a plasticity number of 83 which cured to have a tensile strength of 3375 pounds per square inch.

Solvents or diluents may be used with the chloro-2-butadiene-1,3, as, for example, carbon tetrachloride, toluene, benzene, and the like, as exemplified below.

*Example VIII*

Two hundred fifty parts of chloro-2-butadiene-1,3 were dissolved in 250 parts of carbon tetrachloride and emulsified in 1000 parts of 2 per cent cetyl trimethyl ammonium bromide aqueous solution containing 10 parts sulphur dioxide. After 16 hours at about room temperature, this gave 77.2 per cent yield of a product, with a plasticity number of 86, which after compounding and curing, had a tensile strength of 2200 pounds per square inch.

*Example IX*

Two hundred fifty parts of chloro-2-butadiene-1,3 were diluted with 50 parts of carbon tetrachloride and emulsified in 250 parts of 2 per cent cetyl trimethyl ammonium bromide aqueous solution and 500 parts of water. Two hundred fifty parts of aqueous 2 per cent cetyl trimethyl ammonium bromide solution containing 10 parts sulphur dioxide were added and the emulsion allowed to stand for 22 hours at about room temperature. A 75 per cent yield of a product, with a plasticity number of 87, which, after compounding and curing, had a tensile strength of 3175 pounds per square inch was obtained.

As hereinafter more fully set forth, this invention is not intended to be limited to the use of cetyl trimethyl ammonium bromide as the emulsifying agent in conjunction with sulphur dioxide. Many other emulsifying agents can be used as is illustrated by the following examples.

*Example X*

One hundred parts of chloro-2-butadiene-1,3 were emusified in 360 parts of a solution containing 8 parts of octa decyl trimethyl ammonium bromide. Forty parts of water containing 4 parts of sulphur dioxide were added and the emulsion allowed to polymerize for 20 hours at about room temperature. This gave a 24 per cent yield of a polymer with a plasticity number of 118 which, after compounding and curing, had a maximum tensile strength of 3925 pounds per square inch.

*Example XI*

One hundred parts of chloro-2-butadiene-1,3 were emulsified in 360 parts of a solution containing 4 parts octa decyl trimethyl ammonium bromide, and 40 parts of water containing 4 parts of sulphur dioxide were added. After polymerization at about room temperature over night, this gave an 84 per cent yield of product with a plasticity number of 86 which, after compounding and curing, had a maximum tensile strength of 3850 pounds per square inch.

*Example XII*

One hundred parts of chloro-2-butadiene-1,3 were emulsified in 360 parts of a solution containing 4 parts octa decyl trimethyl ammonium bromide, and 40 parts of water containing 4 parts of sulphur dioxide were added. After polymerization at about room temperature over night, this gave a 92 per cent yield of product with a plasticity number of 111 which, after compounding and curing, had a maximum tensile of 3575 pounds per square inch.

Example XIII

Five hundred parts of chloro-2-butadiene-1,3 were diluted with 500 parts of benzene and emulsified with 2000 parts of 2 per cent aqueous solution of the sodium salt of isopropyl naphthalene sulphonic acid and sulphur dioxide was passed in for 30 minutes. After 18 hours at about room temperature, this gave an 82 per cent yield of a product which was definitely plastic, and, after compounding and curing, had a tensile strength of 1650 pounds per square inch.

Example XIV

One hundred parts of chloro-2-butadiene-1,3 were emulsified in 400 parts of an aqueous solution containing 6 parts hepta-decyl-amine-epichlorhydrin, 2 parts cetyl trimethyl ammonium bromide and 4 parts sulphur dioxide and the emulsion allowed to polymerize at about room temperature over night. This gave a 95 per cent yield of a polymer, which, after milling, had a plasticity number of 77, and, after compounding and curing, had a maximum tensile strength of 3175 pounds per square inch.

This emulsion has the advantage that it can be coagulated merely by making alkaline to Brilliant Yellow and heating to 60° C.

Example XV

One hundred parts of chloro-2-butadiene-1,3 were emulsified in 360 parts of a 1.5 per cent aqueous solution of abietene sodium sulphonate. Forty parts of water containing 2 parts of cetyl trimethyl ammonium bromide and 4 parts sulphur dioxide were added and the emulsion allowed to polymerize at about room temperature over night. An 84 per cent yield was obtained of a product which, after milling, had a plasticity number of 66, and, after compounding and curing, had a maximum tensile strength of 2975 pounds per square inch.

Example XVI

One hundred parts of chloro-2-butadiene-1,3 were emulsified in 360 parts of a 1 per cent aqueous solution of stearyl sodium sulphate, and 40 parts of water containing 2 parts cetyl trimethyl ammonium bromide and 4 parts sulphur dioxide were added. After polymerization at about room temperature, this gave an 82 per cent yield of a product which, after milling, had a plasticity number of 136.

Similar results can be obtained if distenyl dimethyl ammonium bromide is used in place of cetyl trimethyl ammonium bromide in the above example.

Example XVII

Two hundred fifty parts chloroprene was emulsified and polymerized as in Example I except that a 1 per cent aqueous solution of the sodium salts of sulphated cetyl and stearyl alcohols was used throughout instead of a 2 per cent solution of cetyl trimethyl ammonium bromide, and the polymerization was carried out at 30° C. instead of 20° C. The polymerization was complete in 1 hour. After the addition of 2.5 parts of phenyl-beta-naphthylamine dispersed in a small amount of emulsifying solution, the resulting latex was coagulated by the addition of sodium chloride and washed with warm water on a mill with corrugated rolls for 45 minutes, then milled to constant weight on a mill with smooth rolls. A 98 per cent yield of polymer with a plasticity number of 106 was obtained.

Example XVIII

Fifteen parts of liquid sulphur dioxide were dissolved in 100 parts of chloroprene at a temperature below −20° C. and the solution was immediately emulsified by repeated passage through a centrifugal pump in 212 parts of water containing 3 parts of sodium "Lorol" sulphate (see Example XX) and 1 part of the sodium salts of the acids obtained according to U. S. Patent No. 1,191,480 by condensing formaldehyde with naphthalene sulphonic acids. The resulting dispersion was kept at 40° C. until the density reached 1.080 which usually required about 50 minutes. The resulting latex was then treated with a mixture of 1 part of phenyl-beta-naphthylamine (dissolved in 1 part of benzene) and 1 part of tetra methyl thiuram disulphide dispersed in 3 parts of the emulsifying solution and with 1 part of dibutyl amine dissolved in ethyl alcohol. The latex was then coagulated by the addition of a saturated sodium chloride solution. The coagulum was washed with warm water and dried by milling on a rubber mill at about 50° C. Any unreacted sulphur dioxide was volatilized during these latter steps. A polymer, made in this way, when compounded with 20 per cent of litharge and 100 per cent of a soft carbon black under the trade name of "Thermax" and cured for 40 minutes at 153° C., showed an absorption of only 17 per cent, by volume, when immersed in kerosene for 2 days at 100° C.

Example XIX

A product was prepared exactly as in Example XVIII except that 25 parts of sulphur dioxide, 2 parts of normal butyl alcohol (dissolved in the chloroprene) and 2 parts of the sodium "Lorol" sulphate, were used. The kerosene absorption was 11 per cent.

The polymerization of chloroprene in the presence of sulphur dioxide may be further modified by the method described in copending application of Starkweather and Collins Serial No. 156,518, filed July 30, 1937 (for example, by having a mercaptan present during the polymerization), or by the method given in copending application of Collins, Serial No. 204,305, filed April 26, 1938, consisting in having free sulphur present during the polymerization. The resulting product is then plasticized, for example, with a thiuram disulphide and an amine as described in copending application of Youker, Serial No. 264,581, filed March 28, 1939. The effect of these modifications of the present invention is to increase the plasticity of the polymer without, in general, decreasing its resistance to swelling when cured. Thus, a preferred embodiment of the present invention includes the step of polymerizing in the presence of both sulphur and sulphur dioxide. The following is an example of this procedure.

Example XX

One hundred parts of chloroprene, in which 15 parts of sulphur dioxide, 0.24 part of sulphur, and 2 parts of cyclohexanol had been dissolved, were dispersed at 10° C. in 212 parts of water containing 2 parts of sodium "Lorol" sulphate ("Lorol" is a mixture of straight-chain, aliphatic alcohols with an average chain length of about 13 carbon atoms made from cocoanut oil), and 2 parts of an emulsifying agent of sodium salts of the acids obtained by condensing naphthalene sulphonic acids with formaldehyde according to U. S. Patent No. 1,191,480, and polymerized at 42° C. until the density was approximately 1.084. A dispersion of 1 part of the liquid mixture of diphenylamine and phenyl-alpha-naphthylamine dispersed in aqueous sodium abietate solution, a dispersion of 1 part of tetramethyl-thiuram disulfide in the mixture of emulsifying agents used above and a solution of 1 part of dibutylamine in ethyl alcohol were then added to the latex which was then coagulated with salt. The polymer was washed with water on a corrugated mill and then dried by milling on a rubber mill in the presence of 1 part of phenyl-beta-naphthylamine and 1 part of tetramethyl-thiuram-disulphide. The plasticity number of the product was 94. Similar results were obtained by using 2 parts of diorthotolyl guanidine in the place of 1 part of dibutylamine.

When compounded and cured as in the preceding examples, the kerosene absorption was 13 per cent.

The chloroprene used in the examples was substantially free from acetaldehyde, monovinylacetylene, divinylacetylene, methyl vinyl ketone and dichloro-1,3-butene-2. It is possible to obtain satisfactory, although somewhat inferior, results by the use of a less pure chloroprene, particularly if the polymerization is interrupted when the yield is less than with the purer material. Thus, for example, chloroprene containing 0.3 per cent acetaldehyde, 0.3 per cent monovinylacetylene, 0.1 per cent divinylacetylene and 0.3 per cent methyl vinyl ketone may be used. In fact, it is sometimes observed that small amounts of acetaldehyde and monovinylacetylene cause an increase in the tensile strength of the final product. It will be understood, therefore, that this invention is not limited to the use of pure chloro-2-butadiene-1,3 or other halogen-2-butadiene-1,3, although the use of a substantially pure halogen-2-butadiene-1,3 is preferred. Accordingly, the impurities mentioned above or other corresponding ones should not be present in substantial amounts, if the most desirable results are to be obtained. The halogenbutadienes may be polymerized in the presence of other materials, however, to produce useful products as is described herein.

As is apparent from the above examples, this invention is not limited to the use of any particular emulsifying agent in conjunction with the sulphur dioxide when the polymerization is to be carried out in the emulsion form. Several different types of empulsifying agents have been disclosed above and applied to this invention, and, in general, it may be said that any emulsifying agent or mixture of emulsifying agents may be used which is effective to produce a physically stable emulsion in an acid medium, such as is produced by the presence of the sulfur dioxide and which emulsifying agent does not seriously inhibit the polymerization. For example, those disclosed in the Dales and Downing Patent No. 2,138,226, above referred to, would be suitable, although, of course, all would not give equally desirable results. Cetyl and octa decyl trimethyl ammonium bromides illustrate a sub-class consisting of soluble salts of quaternary ammonium bases which contain at least one long chain aliphatic group. Cyclic quaternary ammonium salts such as cetyl pyridinium bromide may also be used successfully. The chlorides or other soluble salts corresponding to these bromides may also be used or compounds such as cetyl or octadecycl betaines of the general formula

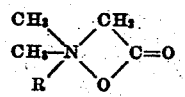

in which R is a long chain aliphatic group, may be substituted as the emulsifying agents. The tertiary ammonium salts with long chain radicals are less effective than the quaternary as emulsifying agents. Octadecyl dimethyl ammonium bromide (stearyl dimethyl amine hydrobromide) and diethylamino ethyl oleyl amide hydrochloride are examples of members of this class which have been used.

Other types of empulsifying agents which may be used are the soluble salts of (A) the sulphate esters of long chain aliphatic alcohols (such as the sodium salt of cetyl or octadecyl sulphate), of (B) sulphonated unsaturated hydrocarbons (such as the sodium salt of abietene sulfonic acid), and of (C) naphthalene sulphonic acids containing hydrocarbon side-chains, such as the products obtained by condensing naphthalene sulfonic acids with formaldehyde.

Another type of emulsifying agent is illustrated by (D) the reaction products of a long chain primary amine with two molecules of epichlorhydrine or glycide. The use of an agent of type A is illustrated by Examples XVI and XVII, type B by Example XV, type C in Example XIII and type D by Example XIV. Dispersions of the chloroprene polymer in solutions of agents of types A, B, and C may be coagulated by the addition of sodium chloride or other water-soluble salt. Dispersions containing agents of type D may be coagulated merely by making alkaline to Brilliant Yellow and heating to 60° C. The coagula are then washed with water to remove the salt and dispersing agent, which, if allowed to remain, would increase the difficulty of milling and also tend to decrease the quality of the cured polymer.

The amount of such emulsifying agents to be employed will, of course, depend upon the effectiveness of the particular agents. Amounts of emulsifying agent ranging from 2 per cent up to 8.4 per cent, based on the chloro-butadiene, are employed in the specific emulsions described above. Greater or less amounts of these or other similar agents may be used. The amount necessary is readily determined by experimental trial in any given case. At least an amount sufficient to prevent separation of a solid or liquid phase, should be present, but if desired, more can be used. It has been observed, as illustrated in Examples II, III, and IV, that increasing the amount of emulsifying agent, in general, results in increasing the speed of polymerization. The present invention includes, within its scope, the use of all concentrations and amounts of emulsifying agents which give stable empulsions (i. e., emulsions in which a solid or liquid phase does not separate out) of halogenbutadiene in the presence of sulphur dioxide. It is also possible to add more emulsifying agent during the course of the polymerization, if desired, either continuously or in one or more batches. Also, it is often desirable to increase the acidity of the emulsion, containing for example, sulphur dioxide, by addition of acid, such as hydrochloric, for example, in such a quantity that the emulsion will turn Congo red paper to a decided blue color.

Sulphur dioxide may be added to the emulsion in any convenient manner, such as, by the direct addition of the gaseous sulphur dioxide or by the addition of a solution of sulphur dioxide in water or in the emulsifying solution or in chloro-2-butadiene-1,3 or by the addition of a salt, such as sodium bisulphite which, upon the addition of acid, will generate sulphur dioxide. The particular method used in the examples was dictated by convenience.

As the examples demonstrate, various concentrations of sulphur dioxide are capable of promoting an improved yield of a more plastic polymer from the chloroprene. Where this improvement in plasticity is the only effect sought, ranges of added sulphur dioxide from 1.6 per cent to 5.6 per cent, based on the chloroprene, are quite satisfactory, although these percentages do not mark the limits of the invention.

It will be noted that, in a number of the above examples, chloroprene is dispersed in the emulsifying solution in about 20 per cent concentration, and that it is then polymerized in the presence of about 4 per cent of sulphur dioxide based on the chloroprene. Such examples, therefore, illustrate embodiments involving the preferred conditions where only high yield of very plastic polymer is important, which comprise the use of about 4 per cent of sulphur dioxide based on the chloroprene, and the use of emulsions in which the concentration of the chloroprene may vary from 20 to 30 per cent.

Where it is desired to produce a polymer which, when cured, has an improved solvent resistance, it is desirable to increase the amount of sulphur dioxide. Although even a small proportion of the sulphur dioxide has a definite effect upon the solvent resistance of the polymer, it is preferred to have at least 5 per cent in chemical combination where the increase in the solvent resistance is an important consideration.

In general, all of the sulphur dioxide added does not enter into stable combination with the chloroprene. When very large proportions of sulphur dioxide, for example equimolecular amounts of chloroprene and sulphur dioxide, are used, the amount of sulphur dioxide in stable combination does not exceed about 25 per cent of the product. As the sulphur dioxide content increases, the solvent resistance increases, but the rubbery properties such as resiliency, elongation, and tensile strength of the cured polymer as well as the plasticity in the uncured state tend to decrease. Consequently, it is preferred to polymerize in the presence of such a percentage of sulphur dioxide as will give from 5 to 15 per cent of combined sulphur dioxide in the product; that is, to polymerize in the presence of from 5.6 to about 30 per cent of sulphur dioxide, based on the chloroprene, where resistance to solvents is important.

It is understood, of course, that sulphur dioxide is a gas at ordinary temperatures, and unreacted volatile sulphur dioxide is removed in the working of the polymer. (See Examples I and XVIII.)

In emulsion polymerization, and also in solution polymerization, it is possible to further vary the manner of applying the invention by varying the concentration of the halogen butadiene in the emulsion or solution, as the case may be. There are, of course, certain limits to the concentration of the halogen butadiene which can be dispersed in a given medium or dissolved in a given solvent. Even within these limits, however, it has not proven expedient, although it is possible, to use either extremely high or extremely low concentrations of halogen butadiene, in emulsions particularly, for various reasons, but it is, nevertheless, to be understood that the invention is not limited to the particular concentrations of chloroprene, employed in the above examples.

The sulphur dioxide need not all be added at one time. Thus, the process in Example II may be altered by adding only 5 parts of sulphur dioxide immediately after emulsification and the remaining 5 parts after the polymerization has proceeded for 1 hour. A yield of 93 per cent of polymer with a plasticity number of 60 was obtained. Further variations consist, for example, in adding the second portion after two hours, or partly after one and partly after two hours or continuously during the first one or two hours of the polymerization. The sulphur dioxide may be added before, during, or after the emulsification step. It has been observed that the formation of insoluble, granular polymer, which sometimes causes trouble in some polymerization processes, does not take place when chloro-2-butadiene-1,3 is polymerized in emulsion in the presence of sulphur dioxide. The same is true of the formation of the volatile, odorous polymers.

The improved process described herein is, moreover, applicable not only to emulsions in water, but also to the polymerization of halogen-2-butadiene-1,3, emulsified in other suitable liquids, in which the halogen-2-butadiene-1,3 can be emulsified and which do not prevent the polymerization of the halogen butadiene and which preferably does not even inhibit its polymerization, such as glycerol, glycols and formamide. Emulsions of this type are broadly disclosed in the U. S. Patents to Carothers, No. 2,080,558, issued May 18, 1937, and to Dales and Downing, No. 2,080,561, issued May 18, 1937. It is further possible to disperse the halogenbutadiene after mixing with the solvent or diluent and then polymerize it as in Examples VIII and IX.

The emulsion of the halogenbutadiene may be prepared in any feasible manner, such as passing the halogenbutadiene together with the emulsifying liquid through a gear pump or a centrifugal pump or by turbulent flow or by agitating the materials with a paddle or stirrer or by shaking them in a suitable container.

While about 20° C. to 60° C. is the preferred polymerization temperature range, it has been found that the polymerization may be effected at temperatures ranging from 0 to 100° C. The rate of polymerization is favorably affected by increasing the temperature so that the time of polymerization required to produce similar products will change somewhat with changes in temperature. The rate of polymerization is also favorably affected by increasing the pressure and also by increasing the concentration of the emulsifying agent, as illustrated by Examples II, III, and IV.

The products produced by the processes illustrated in the above examples will naturally vary considerably in their characteristics, depending upon the particular conditions employed. The extent of polymerization (proportion of chloro-2-butadiene-1,3 consumed) has been found to have a considerable effect upon the properties of the polymer, particularly its plasticity number, as shown above in Examples I and II and in XI and XII. It has been found that the plasticity number may be accurately controlled by determining the extent of polymerization from time to time and interrupting the polymerization (for example, by adding phenyl-beta-naphthylamine), when the proportion of chlorobutadiene polymerized has reached the value, determined by previous experiment, corresponding to the desired plasticity. In general, and particularly under preferred conditions, it has been found that very good results are obtained if the polymerization is stopped sometime after 75 per cent of polymer has been formed. The extent of the polymerization may be determined in a number of ways. The amount of polymer formed may be determined directly, for example, by coagulating and drying a sample of the latex, or, conversely, the extent of the polymerization may be determined by measuring the amount of unchanged chlorodiene recovered by any known efficient method (for example, distillation) from the latex or from the serum obtained by coagulation with alcohol. The density of the latex, which is approximately a linear function of the extent of polymerization, may also be used to follow the reaction. An experienced operator can also roughly estimate the extent of polymerization from the consistency of a coagulated sample. In certain cases, it may be desirable to recover the unchanged chlorobutadiene for reuse. This may be done by methods known to the art, such as removal of the chlorobutadiene by distillation from the latex or from the serum resulting from coagulation or by extraction of the coagulum by solvents such as alcohol, followed in each case by suitable purification.

When the polymerization has progressed to the desired stage, an antioxidant such as phenyl-beta-naphthylamine is added as disclosed above. One per cent of phenyl-beta-naphthylamine, based on the chlorobutadiene is usually added, but greater or somewhat less amounts are effective. Ethyl-beta-naphthylamine, phenyl-alpha-naphthylamine, di-phenylamine, and other similar agents may be used in place of phenyl-beta-naphthylamine. It is, preferably, added in the form of an aqueous emulsion. Frequently it is dissolved in benzene or other suitable solvents before emulsification. The method disclosed in the examples produces very good results, but it will be understood that it may be added in any other convenient way, if desired. It may also be added after coagulation, although not so conveniently. In emulsion polymerization, the phenyl-beta-naphthylamine or other similar agent is also added to assist in arresting the polymerization as disclosed above.

As disclosed in the copending application of Walker, Serial No. 315,749, filed January 26, 1940, now U. S. Patent 2,259,122, the tendency of the product of the present invention to decrease in plasticity on prolonged storage is also greatly reduced by incorporating a compound of the general formula

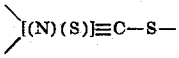

which group, it will be noted, is characterized by having a central carbon, one of the valences of which is satisfied by a sulphur atom and the other three valences of which are satisfied by a nitrogen atom and another sulphur atom together, such, for example, as tetramethyl thiuram disulfide. These agents, which are preferably used together with the antioxidants discussed above, may be added at any time after the polymerization has been completed.

The polymer may be isolated from the aqueous emulsion by any suitable method, for example, by adding ethyl alcohol, as shown in Example I. The polymer may also be obtained from the latex by spray drying or by evaporation of thin films. Coagulation may also be carried out as disclosed in U. S. Patent 2,161,949, and U. S. Patent 2,187,146.

Unless the emulsifying agent is completely removed from the polymer in the coagulation step, it may be desirable to remove substantially all of it before the final milling. This is conveniently accomplished by washing with warm water on corrugated rolls or in an internal mixer, by which methods new surfaces of the polymer are being continuously exposed to washing medium. To assist the extraction of the emulsifying agent, alcohol, acetone, or similar solvent which dissolves emulsifying agent, but not the polymer, may be used.

The coagulum, after being washed, if necessary, may be dried, for example, in a current of air at elevated temperatures up to about 100° C. or at sub-atmospheric pressure or by washing with alcohol, or may be milled directly, the mechanically generated heat in the latter case assisting the removal of the water. The temperature of the polymer being milled, however, preferably will not exceed about 100° C. and is preferably much less. The rolls of the mill should, therefore, be cooled, for example, with cold water or refrigerating brine.

Volatile material can be removed to any desired extent, by any suitable method, for example, by working the coagulated polymer on a rubber mill, substantially all of it being removed by working to a constant weight. This phase of the process may be practiced in other ways, however.

As appears from the examples, it is possible to complete the polymerization in emulsion after partial polymerization in the massive form. The specific illustration in Example VII describes an experiment where chloroprene was emulsified when it was 8.2 per cent polymerized but it will be understood that the halogenbutadiene may be used in the process of the present invention not only when it contains less amounts of polymer, but also when it contains greater amounts. Care must be taken, however, not to allow the polymerization in the massive state to proceed to a point where substantial amounts of the elastic polymer are formed, if maximum yields of plastic polymer are desired.

The further polymerization in emulsion of the partially polymerized halogenbutadiene may be modified in the various particulars described above for the monomer. The sulphur dioxide may be added either before or after emulsification or even before partial polymerization.

It has been stated above that it is generally desirable to remove substantially all of the emulsifying agent before final milling. This statement is subject to exception where an ammonium salt is used as the emulsifying agent. It has been found that the ammonium salts are capable of exerting a stabilizing effect on the plastic polymers. They tend to prevent them from losing their plasticity. It is, therefore, generally desirable to avoid removing these salts from the polymer, insofar as possible during the coagulation, washing, etc., steps. It is to be understood that by the term "ammonium salt," as used in this application, is meant any ammonium salt, either substituted or unsubstituted, unless the term is otherwise qualified.

It has also been found that halogen-2-butadienes-1,3, specifically chloro-2-butadiene-1,3, may be polymerized in the presence of other materials, such as film-forming materials, for example, polymerizable materials containing two carbon atoms in an open-chain joined by more than one bond, by the methods described above, to produce similar results. A preferred embodiment involves the use of polymerizable materials of the class described, which are miscible with chloroprene. The polymerization of the halogen-2-butadienes in the presence of such materials is illustrated by the following examples, which describe the polymerization of chloroprene in emulsion as the preferred embodiment.

*Example XXI*

A mixture of 90 parts of chloro-2-butadiene-1,3 and 10 parts of methyl acrylic nitrile were emulsified in 400 parts of aqueous 2 per cent cetyl trimethyl ammonium bromide containing 4 parts of sulphur dioxide. After 4 hours at about room temperature, this gave 90 parts of a product with a plasticity number of 100, which, after compounding and curing, had a tensile strength of 2425 pounds per square inch.

*Example XXII*

A mixture of 180 parts of chloro-2-butadiene-1,3 and 20 parts of methyl methacrylate were emulsified in 800 parts of aqueous 2 per cent cetyl trimethyl ammonium bromide containing 8 parts of sulphur dioxide. After 4½ hours at about room temperature, this gave 170 parts of a product with a plasticity number of 100 which, after compounding and curing, had a tensile strength of 3000 pounds per square inch.

*Example XXIII*

A mixture of 160 parts of chloro-2-butadiene-1,3 and 40 parts of methyl methacrylate was emulsified in 800 parts of aqueous 2 per cent cetyl trimethyl ammonium bromide containing 8 parts sulphur dioxide. After 4½ hours at about room temperature, this gave 152 parts of polymer with a plasticity number of 95, which, after compounding and curing, had a tensile strength of 2325 pounds per square inch.

*Example XXIV*

Twenty parts of butadiene were dissolved in 180 parts of chloro-2-butadiene-1,3 and the solution emulsified in 800 parts aqueous 2 per cent cetyl trimethyl ammonium bromide containing 8 parts sulphur dioxide. After 4½ hours at about room temperature, this gave an 85 per cent yield of polymer with a plasticity number of 121, which, after compounding and curing, had a tensile strength of 2825 pounds per square inch.

*Example XXV*

Thirty-one parts of butadiene (92 per cent pure), 20 parts of chloro-2-butadiene-1,3, 2.4 parts of sulphur dioxide, and 70 parts of a 2 per cent solution of cetyl trimethyl ammonium bromide were sealed in a thick-walled glass tube containing air and agitated at 60° C. for 112 hours. A thick latex containing some coagulum resulted. Addition of 0.5 part of phenyl-beta-naphthylamine in the usual manner followed by coagulation by the addition of ethyl alcohol and sodium chloride and milling to constant weight gave a 39 per cent yield of mixed polymer containing 21.5 per cent chlorine corresponding to 53.8 per cent of chloro-2-butadiene-1,3. The polymer had a plasticity number of 287 and, on curing for 30 minutes at 141° C., in a mixture composed of 100 parts, by weight, of the polymer, 50 parts of carbon black, 2 parts of stearic acid, 5 parts of zinc oxide, 2 parts of sulphur, and 1.25 parts of mercapto-benzothiazol, gave a tensile strength of 1675 pounds. If the polymerization was carried out in the same manner, except that no sulphur dioxide was used, the yield was substantially the same (35 per cent), but the plasticity number was 470 and the tensile strength only 425 pounds.

The polymerization of halogen-2-butadienes-1,3 and particularly of chloro-2-butadiene-1,3 in the presence of other materials is broadly disclosed in U. S. patents to Carothers, Collins and Kirby, No. 2,029,410, issued February 4, 1936, and Nos. 2,066,329, 2,066,330, and 2,066,331, all issued January 5, 1937. In general, the process of the present invention is applicable to the polymerizations described in those patents as is apparent from the above illustrative examples.

It has been stated that this invention is applicable both broadly and specifically to homologous 3-substituted halogen-2-butadienes-1,3 as well as to the halogen butadienes themselves. The polymerization of one of these homologues in the presence of sulphur dioxide is illustrated by the following examples.

*Example XXVI*

One hundred parts of chloro-2-methyl-3-butadiene-1,3 were emulsified in 400 parts of a 2 per cent solution of cetyl trimethyl ammonium bromide containing 4 parts of sulphur dioxide. After standing for 20 hours at 20–25° C., 1 part of phenyl-beta-naphthylamine was added as in the preceding examples. Eighty-nine parts of a plastic polymer were obtained by coagulating with ethyl alcohol and milling to constant weight.

*Example XXVII*

Two hundred and fifty parts of bromoprene was polymerized exactly like the chloroprene in Example IV of the application except that 15 parts of sulphur dioxide was used and the polymerization was carried on for 50 minutes at 20° C. Ninety-one per cent of a plastic product was obtained.

It is possible to carry out the process of the present invention continuously. Thus, the chloroprene may be continuously emulsified by introducing it together with an emulsifying solution into a suitable emulsifier as described above, said emulsifier being of such construction that the chloroprene is thoroughly emulsified during its passage therethrough. The modifying and other agents can also be added with the chloroprene and emulsifying solution so that the emulsion withdrawn from the emulsifier is ready for polymerization. Alternatively, the modifying agent may be added continuously by bringing together a stream of the emulsion and a stream comprising the modifying agent. The various alternative methods described above for bringing together the starting materials for the polymerization step are applicable to the continuous formation of the emulsion to be polymerized.

The presence of these modifying agents in the continuous polymerization of chloroprene is also advantageous. Such continuous polymerization may be readily effected by passing a stream comprising the chloroprene, for example, an emulsion of chloroprene containing sulphur dioxide through a suitable vessel, for example, a tube maintained at the desired temperature by suitable means, such as a bath, at such a rate that the effluent product from the polymerization vessel has reached the desired stage of polymerization. Continuous polymerization in the presence of a modifying agent is quite conveniently effected when the chloroprene is in an emulsified state, and starting with the chloroprene and other ingredients of the emulsion, the plastic polymer may be produced continuously by continuously emulsifying as described above and then passing the stream of emulsion so prepared for polymerization into the polymerization vessel and therethrough, as described.

If desired, an antioxidant, such as phenyl-beta-naphthylamine, or a stabilizer such as tetra methyl thiuram disulphide, may readily be incorporated continuously into a stream comprising the polymer, for example, the stream issuing from the continuous polymerization vessel, by admitting into the stream comprising the polymer a stream comprising the antioxidant, the stream of antioxidant being admitted at such a rate that the desired amount of antioxidant is added.

The products of this invention, particularly those obtained from chloroprene, are plastic and readily milled, are soluble in benzene, carbon tetrachloride and similar rubber solvents, and, if they contain suitable antioxidants, they retain their plasticity and milling properties on storage at room temperature for some time. They are readily converted by heat, especially in the presence of suitable compounding ingredients at 120° C. to 160° C., to strong, tough, highly elastic products resembling natural rubber in all essential points and having the additional advantage of being much more resistant to the action of organic solvents and chemical reagents generally and of not requiring the use of sulphur and organic accelerators.

Hence, it is obvious that their properties are much the same as the properties of the polymers of chloroprene described by Williams in his U. S. Patent No. 1,950,436. They may, therefore, be put to the same uses as he mentions for his products as well as to others not mentioned by him specifically, although included by his broad description, such as, for example, coating compositions when dissolved in suitable solvents such as benzene, etc., to act as adhesives for wood, glass, metal, paper, cloth, leather, and the like, or they may be used for the impregnation of porous materials. These polymers may also be put to the uses described for the polymers of chloro-2-butadiene-1,3 produced by prior processes in the articles appearing in Ind. Eng. Chem. 25, 1912 (1933), 26, 33 (1934); and in "Rubber Age" for December 10, 1931, at page 213.

To many people, the odor of these cured polymers is less offensive than the odor of vulcanized natural rubber. They have so little odor, in fact, as to be, to many people, substantially odorless.

It is apparent that a novel polymer has been produced, in that it is readily convertible into a substantially odorless, elastic substance. This substantially odorless, elastic, oil-resistant, substance, derived from the new polymer, is also novel. The polymers produced by the process of this invention have an additional point of novelty in that they contain sulphur dioxide in chemical combination.

As shown in the examples, the product produced by the process of the present invention may be compounded and/or moulded and cured to a great variety of elastic products. A wide variety of compounding ingredients and compositions of chloro-2-butadiene-1,3 polymer have been disclosed in the "Duprene Manual," published August 1, 1934, by E. I. du Pont de Nemours and Company as well as in U. S. Patent No. 1,950,436 and the Ind. Eng. Chem. articles, cited above. The methods described therein are applicable to polymers produced by the process of this invention. The nature of the compounding ingredients and the proportions in which they are used, of course, vary with the use to which the compounded polymer is to be put. In general, it may be said that the polymers of this invention may be compounded, cured, and used in the manner described for the plastic polymers of chloro-2-butadiene-1,3 produced by previously known methods.

Thus, while zinc oxide, magnesium oxide, and rosin have been used in most of the examples given above, it is to be understood that carbon black and other compounding ingredients used with previously known plastic polymers of chloro-2-butadiene-1,3 may also be used with those produced by the process of the present invention. It is generally possible also to add some or all of the compounding ingredients, in the form of dispersions in water, to the latex before coagulation. It will be noted, however, that the methods of compounding and curing differ in some respects from those used for natural rubber.

Alternatively, the polymer dispersion or latex obtained as an intermediate in the course of carrying out the present invention may be used as such, with or without the addition of compounding ingredients, but preferably after the addition of antioxidants as described above. In addition, many compounding ingredients may be added to the dispersion prior to polymerization, if desired. The uses of the dispersion are, however, the same as those of natural rubber latex. Thus, for example, it may be used in the preparation of thin-walled articles such as gloves and toy balloons, by dipping a form of suitable shape into the latex, withdrawing, coagulating, and drying the adhering layer, and, if desired, repeating the process, as described by Kirby in U. S. Patent No. 2,076,949, issued April 13, 1937. The articles may then be made elastic by the application of heat. Similarly, latex may be advantageously used for impregnating, coating, or otherwise treating porous or fibrous materials such as paper, cloth, felt, or leather, according, in part, to the teachings of Collins and Larson in U. S. Patent No. 1,967,863, followed, if desired, by curing by the application of heat.

The present invention, therefore, provides a method for polymerizing chloro-2-butadiene-1,3 and related compounds by which stable, plastic polymers, free from undesirable by-products and readily convertible to highly elastic, rubber-like materials of high strength and free from objectionable odor, are formed rapidly, in one step, and in high yield. It will further be seen that both the method of polymerization and the products obtained thereby present numerous improvements over previous inventions in this field.

It is apparent that many widely different embodiments of this invention may be made without departing from the spirit and scope thereof,

I claim:

1. The process of making rubber-like materials which comprises emulsifying, in water, a compound of the general formula

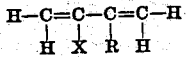

in which X is halogen and R is a member of the group consisting of hydrogen and hydrocarbon radicals, and polymerizing the dispersed compound in the presence of sulphur dioxide to produce a polymeric, rubber-like product containing not more than 25 per cent of the combined sulphur dioxide based on the weight of the product.

2. The process of making rubber-like materials which comprises polymerizing in emulsion bromo-2-butadiene-1,3 in the presence of from about 1.6 per cent to about 30 per cent of sulphur dioxide based on the weight of the bromo-2-butadiene-1,3 to produce a polymeric, rubber-like product containing not more than 25 per cent of combined sulphur dioxide based on the weight of the product.

3. The process of making rubber-like materials which comprises emulsifying chloro-2-butadiene-1,3 in water, and polymerizing the dispersed chloro-2-butadiene-1,3 in the presence of sulphur dioxide to produce a polymeric, rubber-like product containing not more than 25 per cent of combined sulphur dioxide based on the weight of the product.

4. The process of making rubber-like materials which comprises polymerizing in emulsion chloro-2-butadiene-1,3, in the presence of another polymerizable material containing two carbon atoms in an open chain joined by more than one bond, and in the presence of from about 1.6 per cent to about 30 per cent of sulphur dioxide based on the weight of the total polymerizable materials to produce a polymeric, rubber-like product containing not more than 25 per cent of combined sulphur dioxide based on the weight of the product.

5. A heat curable, rubber-like polymer of a compound of the general formula

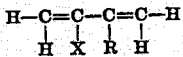

in which X is halogen and R is a member of the group consisting of hydrogen and hydrocarbon radicals, said polymer having sulphur dioxide in chemical combination therewith, the combined sulphur dioxide not exceeding 25 per cent based on the weight of the derivative.

6. A heat curable, rubber-like polymer of chloro-2-butadiene-1,3 having sulphur dioxide in chemical combination therewith, the combined sulphur dioxide not exceeding 25 per cent based on the weight of the polymer.

7. In the process of forming a rubber-like, polymeric derivative of chloro-2-butadiene-1,3, the step of polymerizing said chloro-2-butadiene-1,3 in emulsion in the presence of about 1.6 per cent to about 5.6 per cent of sulphur dioxide based on the weight of the chloro-2-butadiene-1,3.

8. In the process of forming a rubber-like, polymeric derivative of chloro-2-butadiene-1,3, the steps which comprise emulsifying said chloro-2-butadiene-1,3, in water, in the presence of an emulsifying agent of the group consisting of soluble salts of quaternary ammonium bases which contain at least one long-chain aliphatic group, soluble salts of tertiary ammonium bases which contain at least one long-chain aliphatic group, soluble salts of the sulphate esters of long-chain aliphatic alcohols, soluble salts of sulfonated unsaturated hydrocarbons, soluble salts of alkyl naphthalene sulphonic acids, the reaction products of a long-chain primary amine with two molecules of epichlorhydrine and the reaction products of a long-chain primary amine with two molecules of glycide, and then polymerizing the emulsified chloro-2-butadiene-1,3 in the presence of about 1.6 per cent to about 5.6 per cent of sulphur dioxide based on the weight of chloro-2-butadiene-1,3.

9. In the process of forming a rubber-like, polymeric derivative of chloro-2-butadiene-1,3, the steps which comprise emulsifying said chloro-2-butadiene-1,3, in water, in the presence of a soluble salt of a quaternary ammonium base, containing at least one long-chain aliphatic group, and then polymerizing said dispersed chloro-2-butadiene-1,3 in the presence of about 1.6 per cent to about 5.6 per cent of sulphur dioxide based on the weight of the chloro-2-butadiene-1,3.

10. In the process of forming a rubber-like, polymeric derivative of chloro-2-butadiene-1,3, the steps which comprise emulsifying said chloro-2-butadiene-1,3, in water, in the presence of a soluble salt of a quaternary ammonium base, containing at least one-long chain aliphatic group, and then polymerizing said dispersed chloro-2-butadiene-1,3, at a temperature of about 20° C., in the presence of about 4 per cent of sulphur dioxide based on the weight of the chloro-2-butadiene-1,3.

11. In a process for continuously producing a polymeric, rubber-like derivative of chloro-2-butadiene-1,3, the steps which comprise continuously emulsifying chloro-2-butadiene-1,3, in water, continuously adding sulphur dioxide in an amount equal to about 1.6 per cent to about 5.6 per cent, by weight, of the chloro-2-butadiene-1,3 added, and continuously polymerizing the dispersed chloro-2-butadiene-1,3 in the presence of the sulphur dioxide.

12. A heat curable, rubber-like polymer of chloro-2-butadiene-1,3 having in chemical combination with it about 3 per cent of sulphur dioxide based on the weight of the polymer.

13. The process of forming a rubber-like, polymeric derivative of chloro-2-butadiene-1,3, the step of polymerizing chloro-2-butadiene-1,3 in aqueous emulsion in the presence of about 5.6 per cent to about 30 per cent of sulphur dioxide based on the weight of the chloro-2-butadiene-1,3.

14. In the process of forming a rubber-like, polymeric derivative of chloro-2-butadiene-1,3, the steps which comprise emulsifying said chloro-2-butadiene-1,3, in water, and then polymerizing said emulsified chloro-2-butadiene-1,3 in the presence of about 5.6 per cent to about 30 per cent of sulphur dioxide based on the weight of the chloro-2-butadiene-1,3.

15. In a process for continuously producing a polymeric, rubber-like derivative of chloro-2-butadiene-1,3, the steps which comprise continuously emulsifying chloro-2-butadiene-1,3, in water, continuously adding sulphur dioxide in an amount equal to about 5.6 per cent to about 30 per cent, by weight, of the chloro-2-butadiene-1,3 added, and continuously polymerizing the dispersed chloro-2-butadiene-1,3 in the presence of the sulphur dioxide.

16. A heat curable, rubber-like polymer of chloro-2-butadiene-1,3 having in chemical combination therewith sulphur dioxide in an amount of about 5 per cent to 15 per cent of sulphur dioxide based on the weight of the polymer.

17. The process of making a rubber-like material which comprises emulsifying, in water, a compound of the general formula

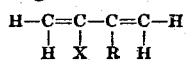

in which X is halogen and R is a member of the group consisting of hydrogen and hydrocarbon radicals and polymerizing the dispersed compound in the presence of from 1.6 per cent to 30 per cent sulphur dioxide based on the weight of the said compound of the general formula.

HOWARD WARNER STARKWEATHER.